US009806599B2

(12) United States Patent
Geske et al.

(10) Patent No.: US 9,806,599 B2
(45) Date of Patent: Oct. 31, 2017

(54) CONVERTER SUBMODULE WITH SHORT-CIRCUIT DEVICE AND POWER CONVERTER HAVING SAME

(71) Applicant: GE Energy Power Conversion Technology Ltd, Rugby, Warwickshire (GB)

(72) Inventors: Martin Geske, Berlin (DE); Joerg Janning, Berlin (DE); Thomas Brueckner, Berlin (DE); Roland Jakob, Berlin (DE)

(73) Assignee: GE ENERGY POWER CONVERSION TECHNOLOGY LTD (GB)

( * ) Notice: Subject to any disclaimer, the term of this patent is extended or adjusted under 35 U.S.C. 154(b) by 0 days.

(21) Appl. No.: 15/182,746

(22) Filed: Jun. 15, 2016

(65) Prior Publication Data

US 2016/0365787 A1 Dec. 15, 2016

(30) Foreign Application Priority Data

Jun. 15, 2015 (DE) .......................... 10 2015 109 466

(51) Int. Cl.
*H02M 7/483* (2007.01)
*H02M 7/44* (2006.01)
(Continued)

(52) U.S. Cl.
CPC ................ *H02M 1/32* (2013.01); *H01T 1/14* (2013.01); *H01T 2/02* (2013.01); *H01T 15/00* (2013.01);
(Continued)

(58) Field of Classification Search
CPC .......... H02M 7/04; H02M 7/06; H02M 7/062; H02M 7/12; H02M 7/42; H02M 7/44;
(Continued)

(56) References Cited

U.S. PATENT DOCUMENTS

2008/0232145 A1 9/2008 Hiller et al.
2008/0252142 A1 10/2008 Davies et al.
(Continued)

FOREIGN PATENT DOCUMENTS

CA 1159103 A 12/1983
DE 10323220 A1 12/2004
(Continued)

OTHER PUBLICATIONS

Chokhawala et al., "A Discussion on IGBT Short Circuit Behavior and Fault Protection Schemes", International Rectifier Corporation, IEEE, pp. 393-401, 1993.
(Continued)

*Primary Examiner* — Timothy J Dole
*Assistant Examiner* — Ivan Laboy Andino
(74) *Attorney, Agent, or Firm* — GE Global Patent Operation; Scott R. Stanley

(57) ABSTRACT

A short-circuit device and a protection method for a submodule for a power converter are disclosed. The submodule includes a bridge circuit having at least one power semiconductor branch extending between a first and a second DC voltage node and at least one controllable power semiconductor switch disposed therein to which a freewheeling diode is connected in anti-parallel, and a capacitor connected in parallel to the bridge circuit. The short-circuit device has at least one selected of the freewheeling diodes anti-parallel to the power semiconductor switches of the bridge circuit, wherein the at least one selected freewheeling diode is manufactured in press pack design and rated such that, when a fault occurs in the submodule, the at least one selected freewheeling diode breaks down due to the fault conditions and provides a durable, stable, low-impedance short circuit path between a first and a second AC voltage connection of the submodule.

17 Claims, 6 Drawing Sheets

(51) Int. Cl.
 *H02M 7/04*    (2006.01)
 *H02M 1/32*    (2007.01)
 *H02H 9/04*    (2006.01)
 *H02H 7/12*    (2006.01)
 *H01T 15/00*    (2006.01)
 *H01T 1/14*    (2006.01)
 *H01T 2/02*    (2006.01)

(52) U.S. Cl.
 CPC .............. *H02H 7/12* (2013.01); *H02H 9/041* (2013.01); *H02M 7/04* (2013.01); *H02M 7/44* (2013.01); *H02M 7/483* (2013.01); *H02M 2001/325* (2013.01); *H02M 2007/4835* (2013.01)

(58) Field of Classification Search
 CPC .......... H02M 7/48; H02M 7/483; H02M 7/49; H02M 7/537; H02M 7/5387; H02M 7/5388; H02M 7/797; H02M 1/32; H02M 2001/322; H02M 2001/325; H02M 2007/4835; H02J 3/36; H02H 9/041; H02H 7/12
 USPC ................ 363/15–17, 34, 35, 37–43, 50–55, 363/56.01–56.05, 57–58, 84–89, 95–98, 363/123, 125, 127, 131–132, 135–138
 See application file for complete search history.

(56) References Cited

U.S. PATENT DOCUMENTS

| | | | |
|---|---|---|---|
| 2010/0020577 A1 | 1/2010 | Dommaschk et al. | |
| 2010/0066174 A1 | 3/2010 | Dommaschk et al. | |
| 2011/0044082 A1* | 2/2011 | Norrga | H02M 7/483 363/127 |
| 2012/0063181 A1* | 3/2012 | Chimento | H02M 1/32 363/56.03 |
| 2012/0063185 A1 | 3/2012 | Janning | |
| 2013/0063995 A1 | 3/2013 | Norrga et al. | |
| 2013/0235624 A1 | 9/2013 | Janning | |
| 2013/0252039 A1 | 9/2013 | Vom Dorp et al. | |
| 2014/0043873 A1* | 2/2014 | Blomberg | H02M 1/32 363/53 |
| 2016/0204603 A1 | 7/2016 | Bobert et al. | |

FOREIGN PATENT DOCUMENTS

| | | |
|---|---|---|
| DE | 10333798 A1 | 2/2005 |
| DE | 102010046142 A1 | 3/2012 |
| DE | 102011086087 A1 | 5/2013 |
| DE | 102013108658 A1 | 2/2015 |
| EP | 2100368 B1 | 9/2011 |
| EP | 2642582 A2 | 9/2013 |
| WO | 2008067788 A1 | 6/2008 |

OTHER PUBLICATIONS

Schibli et al., "Single- and Three-Phase Multilevel Converters for Traction Systems 50Hz/16 2/3 Hz", 7th European conference on Power Electronics and Application (EPE), vol. No. 4, pp. 210-215, 1997.

Postiglione et al., "Transformerless STATCOM Based on Multilevel Converter for Grid Voltage Restoring", PCIM Power Electronics Conference, vol. No. 1, pp. 397-403, 2011.

Ladoux et al., "On the Potential of IGCTs in HVDC", Emerging and Selected Topics in Power Electronics, vol. No. 03, Issue No. 03, pp. 780-793, Sep. 2015.

German Office Action issued in connection with corresponding DE Application No. 102015109466.5 on Nov. 20, 2015.

European Search Report and Opinion issued in connection with corresponding EP Application No. 16174318.2 on Oct. 7, 2016.

* cited by examiner

CONVERTER SUBMODULE WITH SHORT-CIRCUIT DEVICE AND POWER CONVERTER HAVING SAME

BACKGROUND

Embodiments of the present invention relate to a submodule for a power converter that has a short-circuit device, and a power converter with a number of such series-connected submodules.

Power converters for conversion of direct current into alternating current and vice versa and for many other purposes are frequently built of submodules that have a bridge circuit with controllable power semiconductor switches and an internal capacitor for temporary storage of electrical energy that forms a direct voltage intermediate circuit. The bridge circuit is connected in parallel with the intermediate circuit and can be formed, e.g., by a half bridge with two controllable power semiconductor switches that are connected in series. The bridge circuit can also be a so-called H-bridge or full bridge that has two parallel power semiconductor branches connected to the intermediate circuit, each of which has two power semiconductor switches arranged in series in it. Each controllable switch has an anti-parallel freewheeling diode assigned to it. The power semiconductor switches are controlled in a suitable way to produce an alternating voltage at the connection points of the switches, for example. Conversely, alternating voltage at the connection points of the switches can be converted into direct voltage to feed the intermediate circuit.

For high-power power converters, multiple such submodules are usually connected in series with one another to allow high rated system power in the megawatt range and high-voltage applications such as high-voltage direct current (HVDC) transmission systems, and to produce largely sinusoidal voltages with fine gradation. Redundancy requirements, according to which the function of a device must be ensured even when one or more submodules fail, can also require the use of multiple series-connected power converter submodules.

It is important that a failed submodule does not, to the extent possible, affect the functionality of the entire system. A fault can be caused by a damaged or destroyed power semiconductor switch or a damaged or destroyed freewheeling diode of the bridge circuit or also by a failure in the driver of the power semiconductor switch. Various semiconductor switches are available for use. E.g., the submodules can be built using insulated-gate bipolar transistors (IGBTs) in so-called flat-pack or modular design that have multiple IGBT and anti-parallel diode chips on a substrate. Each chip is electrically connected through bond wires with the module-internal busbar. When a fault occurs, a short circuit current can cause an IGBT chip to break down and form a short circuit between its collector and its emitter connection. The defective chip then usually conducts the entire fault current, whose intensity and the overheating associated with it can lead to the melting or tearing off of the bond wires within microseconds. This can result in arcing faults that can lead to an explosion of the IGBT module in question and other IGBT modules, and finally open the electric circuit of the entire submodule. This would interrupt the current in the series circuit of the submodules, which would have the consequence of shutting down the entire power converter. This should be prevented. When a fault occurs, it may be beneficial to set up a long-term low-impedance current path between the AC voltage connections of the faulty submodule, to allow redundancy between the submodules and ensure the further functionality of a power converter or the entire system.

In one process used to short-circuit a faulty submodule of a power converter, the submodule is connected with a full bridge circuit and with at least one internal intermediate circuit capacitor as energy storage in a series circuit of submodules, all power semiconductor switches being controlled in such a way when a fault occurs that they permanently break down to create a durable short-circuit of the direct voltage side of the submodule. When a fault occurs, the power semiconductor switches are destroyed, which can be costly. Implementing the process to achieve, on the one hand, a quick breakdown of the power semiconductor switches and simultaneously avoid the formation of arcing faults and explosion of the submodule components, which are manufactured in a modular design, can be very complicated and in many cases also scarcely achievable.

In another aspect, a short circuit for a faulty power converter submodule has an internal intermediate circuit capacitor and a full bridge circuit wherein each intermediate circuit capacitor has an electronic semiconductor device connected in parallel with it that, when a submodule fault occurs, either accepts a short circuit current of the intermediate circuit capacitor or, depending on such a short circuit current, is controlled and then permanently breaks down, or breaks down as a consequence of an excessive capacitor voltage. The semiconductor device connected in parallel with the intermediate circuit capacitor can be a diode, a short-circuit thyristor, or a power semiconductor switch, in particular an IGBT. When a fault occurs, e.g., the short-circuit thyristor is fired, and the power semiconductor switches of the bridge circuit are controlled in such a way that they desaturate and the short circuit current quickly commutates to the fired short-circuit thyristor, which then breaks down and forms a durable short-circuited bypass path. Such a bypass branch with the associated semiconductor device requires additional components and increases the complexity of the circuit.

It is also usual in practice today to provide so-called AC short-circuiters that are formed, for example, by fast-switching mechanical switches that are arranged in a bypass branch between the AC voltage connections of the submodule and are closed when a fault occurs to create a short circuit bypass path between the AC voltage connections. Here again, additional components are required for the bypass path.

BRIEF DESCRIPTION

An embodiment of the present invention relates to a submodule for a power converter with at least one controllable power semiconductor switch to be short-circuited with low effort when a fault occurs. In particular, in an embodiment of the present invention, a power converter submodule includes low-complexity short circuiting means that allow the creation of a durable, stable low-impedance short circuit path between the AC voltage connections of the submodule when there is a fault in the submodule, so that the long-term operation of the power converter and an entire system can be continued.

Another embodiment of the present invention relates to a power converter with multiple such submodules.

One aspect of the invention provides a power converter submodule that has a bridge circuit, a capacitor, and a short circuit device. The bridge circuit has at least one power semiconductor branch which extends between a first and a second DC voltage node and has at least one controllable power semiconductor switch arranged therein, with a freewheeling diode connected in anti-parallel thereto. The capacitor serves as a DC voltage intermediate circuit capacitor and is connected in parallel to the bridge circuit between the first and second DC voltage nodes. The short circuit device has at least one selected of the freewheeling diodes anti-parallel to the power semiconductor switches, the at least one selected freewheeling diode being manufactured in press pack design (pressure contact housing design) and being designed so that when a fault occurs in the submodule as a consequence of fault conditions it breaks down and creates a durable, stable, low-impedance short-circuit path between a first and a second AC voltage connection of the submodule, through which the load current can bypass the active power semiconductor switches on a long-term basis, to allow continued operation of the power converter and an entire system.

The press pack design involves pressing the power semiconductors between pressure contact plates so that they are sealed. When a fault occurs with following anode-cathode short-circuit of the diode, the pressure contacting ensures that the diode forms a stable and very low-impedance short circuit. Although the press pack design is relatively elaborate and expensive, here it is extremely useful for the additional protection function of the freewheeling diode for the bypass path, since it ensures long-term short circuit stability and high housing breaking strength. The high breaking strength effectively prevents parts or broken pieces from coming out of the pressure contact housing when a fault occurs, which can also avoid damage to surrounding system components. The power converter or the system can continue to be operated for months or even years until the next scheduled service stop, at which the faulty submodule can then be replaced.

According to an embodiment of the present invention, the short circuit mode is reached when a fault occurs merely with at least one of the anti-parallel freewheeling diodes, which are present anyway and which in normal operation otherwise serve to conduct the operating current and/or protect the associated power semiconductor switches against unacceptable overvoltages or reverse voltages. The primary embodiments of the protective function do not require any additional bypass branches or any additional electronic components other than those already present, which reduces the complexity of the circuit and the effort to design and control the components of the submodule.

In principle, the bridge circuit of the submodule can be a half bridge circuit which has a single bridge arm with at least two power switches connected in series. However, in an embodiment the submodule may have a bridge circuit in the form of a so-called H-bridge or full bridge circuit with two parallel power semiconductor branches which are connected between the first and the second DC voltage nodes and each of which has at least one power semiconductor switch, each of which with an anti-parallel freewheeling diode. Such H-bridge circuits are known in the art and are widely used in submodules for power converters.

In one embodiment, the submodule can be in the form of a bidirectional submodule with a symmetrical H-bridge or full bridge, for use both for inverters and for rectifiers. In particular, the power semiconductor branches can each include two power semiconductor switches connected in series, each having an anti-parallel freewheeling diode associated thereto and the connection points thereof forming the first and second connection of the submodule, respectively.

In another embodiment, the submodule can be provided with an asymmetric or reduced H-bridge or full bridge for use either for inverters or for rectifiers. In particular, the bridge circuit can have a first power semiconductor branch with a series connection of a first power semiconductor switch and a first diode, and a second power semiconductor branch with a series connection of a second power semiconductor switch with a second diode, the first and second diodes being arranged in a bridge diagonal of the bridge circuit and each power semiconductor switch having an anti-parallel freewheeling diode associated with it. A connection point between the first power semiconductor switch and the first diode forms the first connection of the submodule, and a connection point between the second power semiconductor switch and the second diode forms the second connection of the submodule.

All embodiments can use an advantageous mixture of manufacturing technologies. E.g., all power semiconductor switches, e.g., IGBTs, and also those diodes that are not part of the short circuit device, can be manufactured in flat-pack or modular design, while only the one or more selected freewheeling diodes of the short circuit device are manufactured in press pack design. This makes it possible to reduce the costs of the submodule, while the press pack freewheeling diodes provide high functional reliability. Generally the use of power semiconductor switches, e.g., IGBTs, in press-pack design is also possible in all described embodiments; however, this is not required for all embodiments of the present invention, and is generally not desired because of the increased costs.

In embodiments, the bypass path has no electronic components other than the broken-down freewheeling diode(s) and the first and/or second diode, if present. The short circuit function can be realized with little expense, using only components of the bridge circuit that are already present.

In another embodiment, the submodule can alternatively or additionally have a temperature influencing device configured to cause an increase of temperature at or in the vicinity of the at least one freewheeling diode when a fault occurs in the submodule. To accomplish this, when a fault occurs the free-wheeling diode can, e.g., be heated or its cooling reduced, to cause the freewheeling diode to break down.

In yet another embodiment, the submodule can alternatively or additionally have a triggerable spark gap connected in a branch between the first and second DC voltage nodes that is parallel to the bridge circuit, wherein the spark gap when triggered causes a fault current through the submodule with a reversing current which effects the breakdown of the at least one freewheeling diode. The short circuit fault mode can be brought about in a controlled and extremely responsive way. Instead of the spark gap, it would also be possible to provide, e.g., a bypass branch parallel to the capacitor with a controllable semiconductor switch, such as, e.g., an IBGT or a thyristor.

In the above-mentioned embodiments the fault conditions resulting in a breakdown of the at least one freewheeling diode can include at least one of an overvoltage across the at least one selected freewheeling diode, an overtemperature at the freewheeling diode and an excessive fault current (surge current) through the freewheeling diode.

In an embodiment, the submodule has a drive unit associated with it that is configured, upon detecting a fault, to switch off all power semiconductor switches of the submodule, or keep them switched off. This process is also designated as triggering of pulse blocking. An embodiment of the present invention utilizes this process by causing further current flow through the submodule to continue to charge the capacitor through the freewheeling diodes and/or the first and second diode of the bridge circuit. When a fault occurs, the capacitor can be charged to a voltage that produces a voltage on the at least one selected freewheeling diode that exceeds its maximum reverse voltage and thus brings about its breakdown.

The drive unit of the submodule is also configured to control the temperature influencing device and/or to trigger the spark gap, if present.

Another aspect of the invention provides a power converter for converting an AC voltage into a DC voltage or vice versa. The power converter has at least one phase branch with two or more series-connected submodules, as described above. The series connection is made in such a way that at least one first AC voltage connection of at least one submodule is electrically connected to the second AC voltage connection of an adjacent submodule. Each branch also has, in about the middle, an AC voltage connection of the power converter tapped in for connection with an electrical network, an electrical alternating current (AC) machine, an AC generator, a wind power plant, a separate network, or the like. The power converter can have any of the above-mentioned embodiments of the submodule with their advantageous properties. The power converter is especially suitable for use in an HVDC transmission system or a high-power converter, and also when redundancy requirements must be met.

In any case, the power converter is configured to short-circuit a faulty submodule for long time in a stable manner, to allow the power converter to continue to operate. To accomplish this, in an embodiment, the power converter also has a passive or active detection circuit configured to detect a DC-side short-circuit fault in any of the submodules of the power converter, and a control device that is connected with or includes the drive unit, which is configured, upon detection of such a short-circuit fault, to switch off all power semiconductor switches of the submodule, or keep them switched off, and, if needed, to take further measures to introduce or cause the short-circuit fault mode. This can include a thermally influencing the at least one freewheeling diode for the bypass path or firing a spark gap, to cause breakdown of the at least one selected freewheeling diode by a reversing current. It is insignificant for the function whether the drive unit(s) for the power semiconductor switches and possibly other protective functions are associated with the submodules or the power converters.

BRIEF DESCRIPTION OF THE DRAWINGS

Further advantageous details about embodiments of the invention follow from the subclaims, the drawing, and the associated description. The embodiments are described below in greater detail using a drawing, which shows exemplary embodiments of the invention that are not limiting in any way, the same reference numbers being used in all figures to designate the same elements. In the figures:

DETAILED DESCRIPTION

Figure 1:
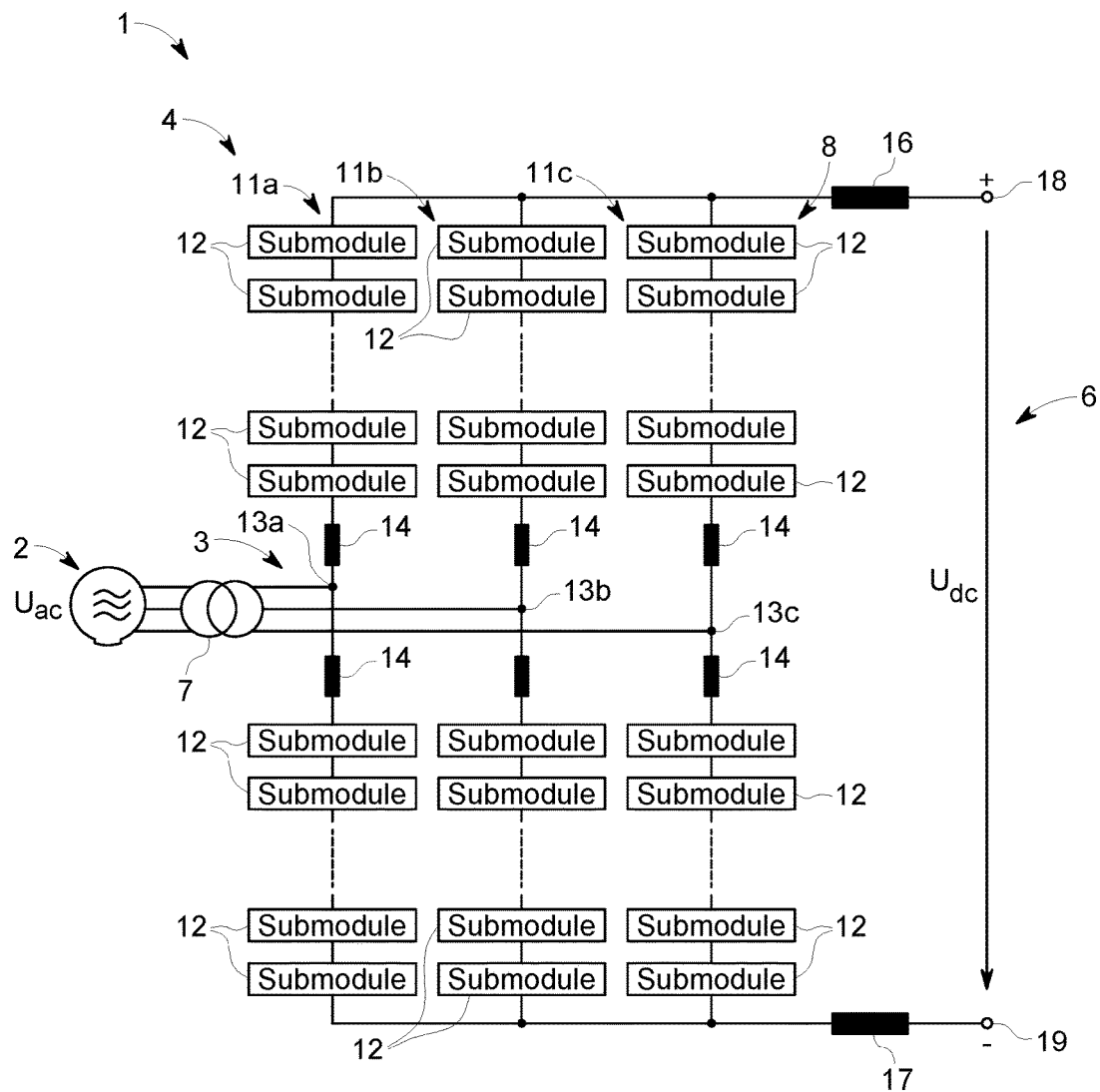
FIG. 1 is a block diagram of an exemplary system with an electrical converter built of multiple submodules to couple an electrical energy supply network or another alternating voltage source with another network or a load, to illustrate an exemplary application of an embodiment of the present invention.

FIG. 1 illustrates, in a greatly simplified representation, a system 1 that can be used for a high voltage direct current distribution system for electrical energy transmission at high direct current (DC) voltage or for many other applications. The system 1 has here, e.g., a three-phase alternating current (AC) voltage source 2, which can be, e.g., an electrical energy supply network, an electrical alternating current (AC) machine, an AC generator, a wind power plant, or the like. The AC voltage source 2 has an electrical converter 4 connected to it with its input 3; the output 6 of this electrical converter 4 can be connected with another electrical energy supply network through a DC transmission device (not shown). The connection of the converter 4 to the AC voltage source 2 can optionally be made through a transformer 7.

The converter 4 has at least one first power converter 8, which can be a rectifier here, to convert an AC voltage $U_{ac}$ of the AC voltage source 2 into an output-side DC voltage $U_{dc}$. The converter 4 could optionally have another power converter (not shown) that converts the voltage $U_{dc}$ into an appropriate AC voltage. It goes without saying that the functions of the power converters are interchanged if the energy flow is in the opposite direction to the energy supply network or the voltage sink 2.

As is apparent from FIG. 1, the power converter 8 here has, as an example, three phase branches 11a, 11b, and 11c, each of which is formed by a series circuit of multiple power converter submodules or modular switches 12 that are connected in series. The controllable direct voltage at output 6 of the power converter 8 can be dynamically changed through the switching states of the individual power converter submodules. The number of power converter submodules 12 determines the available number of power converter switching states, which allow fine voltage gradation and a high-quality voltage waveform. Thus, the power converter 8 is a so-called multilevel or multipoint converter. The submodules 12 are explained in more detail below in connection with FIGS. 2A-6.

In the phase branches 11a-11c, circulating current-limiting inductances 14 can be provided at the power converter AC voltage connections 13a, 13b, 13c. The DC voltage output-side connections of the first, topmost submodules 12 of the rectifier 8 are connected with one another and, through a DC voltage intermediate circuit inductance 16, with a first power converter DC voltage connection ("+") 18. Similarly, the output connections of the last, lowest submodules 12 of the power converter 8 are connected with a second power converter DC voltage connection ("−") 19 through another DC voltage intermediate circuit inductance 17. Between the output connections 18, 19 there is a DC voltage of $U_{dc}$, which can be a high voltage of, e.g., over 100 kV.

Figure 2A:
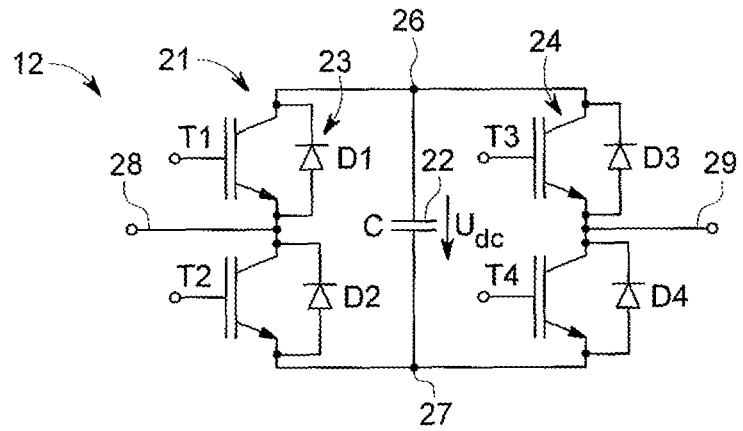
FIGS. 2A, 2B, and 2C show simplified circuit diagrams of power converter submodules with different full bridge topologies that can be used in the electrical converter shown in FIG. 1 in accordance with an embodiment of the present invention.
Figure 2B:
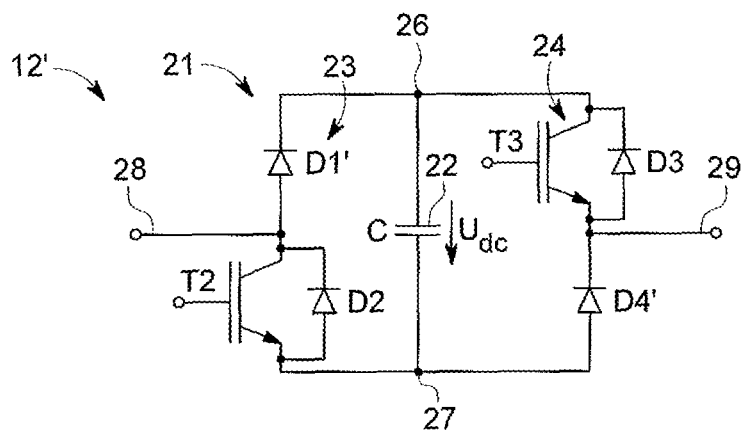
Figure 2C:
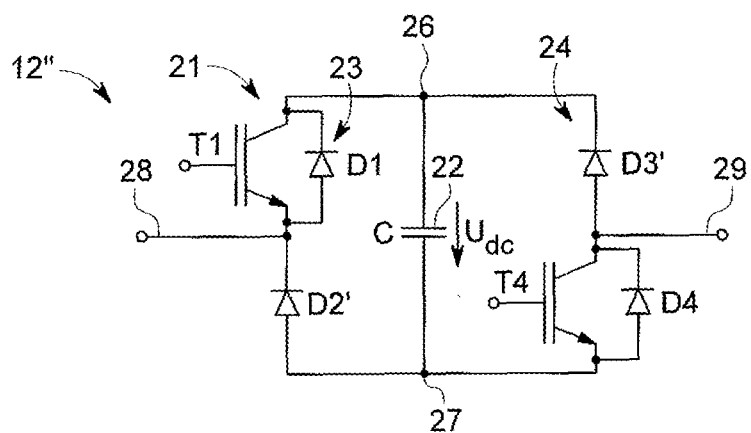

FIGS. 2A, 2B, and 2C show simplified circuit diagrams of different topologies known as such of a submodule or modular switch 12, as they can be used and further developed in the multilevel power converter 8 of the type shown in FIG. 1, to implement an embodiment of the present invention.

The bidirectional submodule 12 shown in FIG. 2A has a bridge circuit 21 and a capacitor C, 22 that is connected in parallel to the bridge circuit 21. The bridge circuit 21 here is in the form of a so-called symmetrical H-bridge or full bridge with two parallel power semiconductor branches 23, 24, that are connected parallel to one another between a first and a second DC voltage node 26, 27. The first power semiconductor branch 23 has a series connection of a first power semiconductor switch T1 and a second power semiconductor switch T2, each of the first and the second power semiconductor switches T1, T2 being associated with freewheeling diodes D1 and D2, respectively, that are connected in anti-parallel or inverse parallel. The freewheeling diodes D1, D2 serve to conduct operating current when power semiconductor switch T1 or T2 is opened and to protect the associated power switches against unacceptable overvoltages or reverse voltages. The freewheeling diodes D1, D2 can also fulfill a protective function for the submodule 12 when there is a fault in the submodule 12, as is explained in detail below.

Similarly, the second power semiconductor branch 24 has a series connection of a third and a fourth power semiconductor switch T3, T4, each of which has a freewheeling diode D3 and D4, respectively, connected in anti-parallel to it. The freewheeling diodes D3, D4 fulfill the same function as the freewheeling diodes D1, D2.

The power semiconductor switches T1-T4 are controllable switches, which are advantageously formed here by IGBTs (insulated-gate bipolar transistors). However, in principle, other transistors, such as, e.g., field effect transistors, gate turn-off thyristors, or other comparable electronic components could also be used. The terms collector, emitter, and gate electrode used herein relate to the use of IGBTs as the power semiconductor switches T1-T4 of the bridge circuit 21, the person skilled in the art commonly using the corresponding terms for connections or electrodes of other comparable semiconductor devices.

As is apparent from FIG. 2A, the emitter of the first power semiconductor switch T1 is connected with the collector of the second power semiconductor switch T2, the connection point forming a first AC voltage connection 28 of the submodule 12 that alternatively can be an input or output connection. Likewise, the emitter of the third power semiconductor switch T3 is connected with the collector of the fourth power semiconductor switch T4, the connection point forming a second AC voltage connection 29 of the submodule 12 that alternatively can be an input or output connection.

Connected in parallel with the two parallel series circuits or power semiconductor branches 23, 24 is the capacitor C, which serves as energy storage 22 and which can also be designated as a DC intermediate circuit capacitor of the submodule 12. The DC voltage $u_{dc}$ across the capacitor C is always positive due to the connection of the freewheeling diodes D1-D4, and can be, e.g., between several hundred volts and several kV, depending on its rating and application. The voltage between the AC connections 28, 29 of the submodule 12 can assume essentially the values $-u_{dc}$, $+u_{dc}$, or 0. The DC voltage $u_{dc}$ on the capacitor C can become larger or smaller. A current can flow through the submodule 12 in both directions, that is from connection 28 to connection 29, or vice versa from connection 29 to connection 28.

FIGS. 2B and 2C show submodules 12', 12'', which have been modified from the submodule 12 in FIG. 2A. Here the submodules 12', 12'' are formed by unidirectional switch modules in which the current flows in only one direction between the connections 28, 29 during regular operation.

In contrast to the submodule 12 in FIG. 2A, in FIG. 2B, the power semiconductor switches T1 and T4 on a bridge diagonal of bridge circuit 21 are omitted here, so that each power semiconductor branch 23, 24 has a series connection of a power converter diode D1' and D4', respectively, and a power semiconductor switch T2 and T3, respectively, with the freewheeling diode D2 and D3, respectively, anti-parallel to it. In other words, the combinations of a power semiconductor switch T1 and T4 with associated anti-parallel freewheeling diode D1 and D4, respectively, are replaced by diodes D1' and D4' on a bridge diagonal. The power semiconductor switches T2, T3 that are present are associated with the anti-parallel freewheeling diodes D2 and D3, respectively.

The AC voltage connections 28, 29 of the submodule 12' are defined at the connection points between the first diode D1' and the second power semiconductor switch T2 in the first power semiconductor branch 23 and at the connection point of the third power semiconductor switch T3 with the fourth diode D4' in the second power semiconductor branch 24. During regular operation, the current through the submodule 12' always flows in the same direction determined by the diodes D1' and D4', namely in the direction from the first connection 28 to the second connection 29. Therefore, when the submodules 12' are connected in series in the power converter 8, care must be taken that the current flow direction is the same in all submodules. The voltage between the connections 28, 29 of the submodule 12' can assume essentially the three values $+u_{dc}$, $-u_{dc}$, and 0, where $u_{dc}$ is the voltage across the capacitor C, 22.

The submodule 12'' shown in FIG. 2C differs from that shown in FIG. 2B only in that the bridge diagonals are interchanged here. Thus, the second and the third power semiconductor switches T2, T3 (with associated freewheeling diodes D2, D3) are replaced by diodes D2', D3'. The submodule 12'' is also a unidirectional switch module, in which during regular operation the current flow is now determined by the diodes D2' and D3' and runs from the second submodule connection 29 to the first submodule connection 28. In other respects, the discussion concerning the submodule 12' correspondingly applies here.

In an embodiment, the submodules 12, 12', and 12'' are made of IGBTs, which are manufactured in a modular or so-called flat-pack design. In this design, the multiple IGBT and anti-parallel diode chips are formed on a substrate and each is electrically connected through bond wires with a module-internal busbar. When a fault occurs, e.g., an emitter-collector short-circuit of an IGBT chip, the fault current might then be conducted only through a faulty chip, which means that durable, reliable conduction of the current can no longer be ensured. This can possibly have the consequence of the formation of short circuit currents of very high amplitude, even exceeding 100 kA (compared with a normal operating current of, e.g., 1-2 kA), and extremely high current densities in the bond wires of the faulty chip. The bond wires can melt or separate within a few microseconds and cause arcing, which can lead to an explosion of components or the entire module. Explosion of the IGBT or diode chip can in turn put the AC or DC side of the submodules 12, 12', 12" in the idle state, making the entire power converter 8, 9 inoperable. The explosion can also cause a chain reaction and damage many components of a system.

To avoid this, an embodiment of the present invention provides a short circuit device 30 that is configured to set up, when a fault occurs in the submodule 12, 12', or 12", a durable, stable low-impedance short-circuit fault mode of the submodule 12, 12', 12" in which a short circuit current through the submodule can flow along a bypass path, bypassing a respective power semiconductor switch T1-T4. The short circuit device 30 is described in more detail below on the basis of the FIGS. 3 through 7.

The inventive short circuit device 30 has selected freewheeling diodes of the converter submodule that are anti-parallel to the power semiconductor switches, in particular at least two selected freewheeling diodes D1-D4 of the submodule 12 (FIG. 2A) or at least one selected freewheeling diode D2, D3 of the submodule 12' (FIG. 2B) or D1, D4 of the submodule 12" (FIG. 2C). To accomplish this, the selected freewheeling diodes are manufactured in press pack design and are designed so that when a fault occurs in the respective submodule 12, 12', or 12" as a consequence of fault conditions they break down and are able to assume a possible short circuit current and form part of the bypass path between the AC connections of the submodule.

Figure 3A:
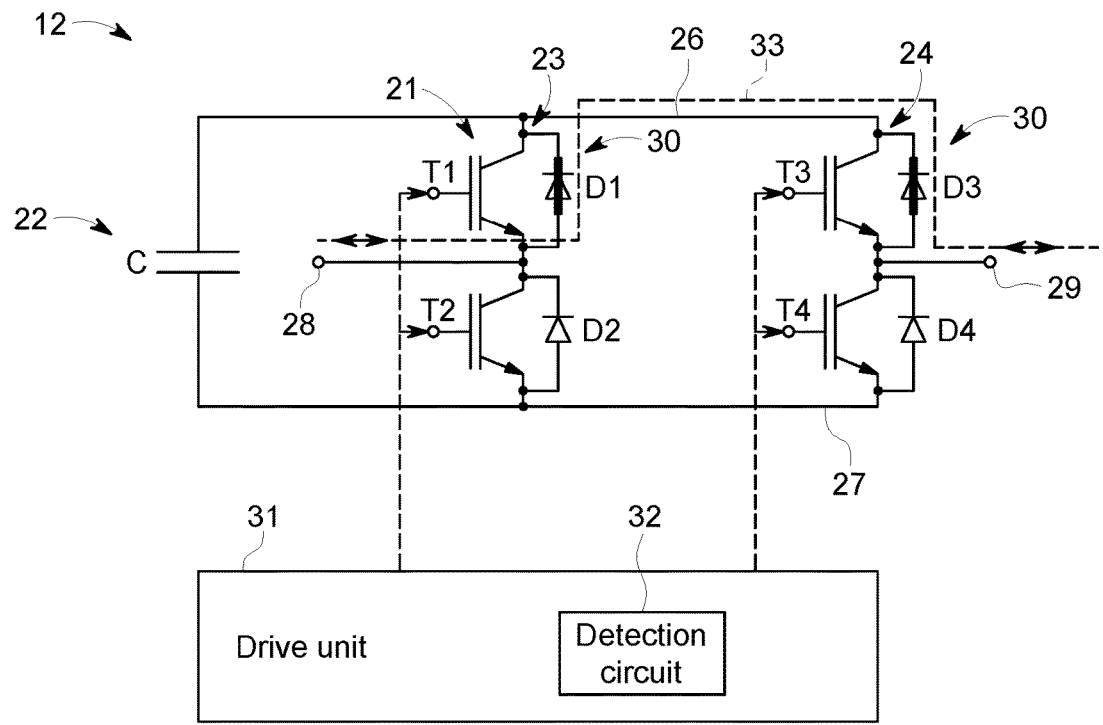
FIGS. 3A, 3B, and 3C show simplified circuit diagrams of different embodiments of a power converter submodule with the symmetrical full bridge topology shown in FIG. 2A, illustrating various resulting bypass paths.
Figure 3B:
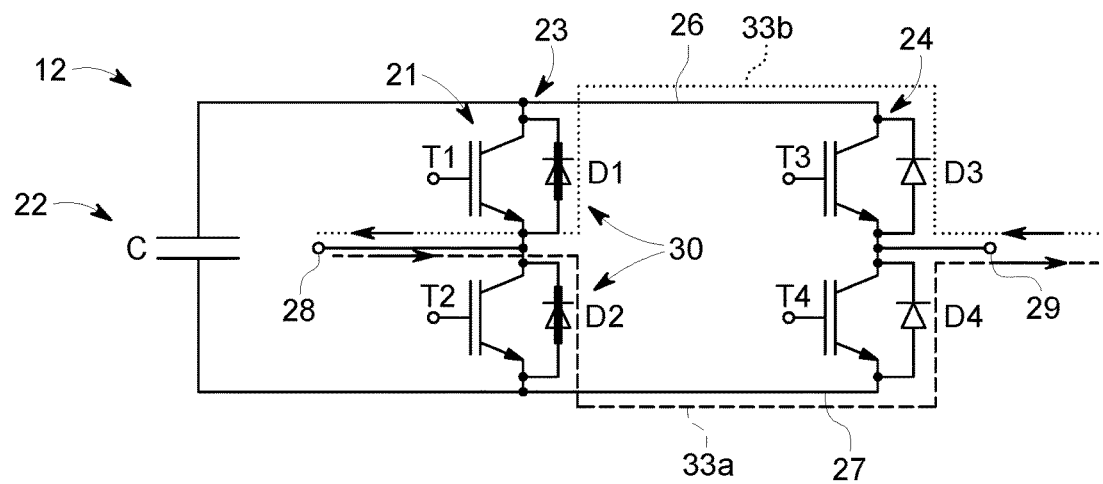
Figure 3C:
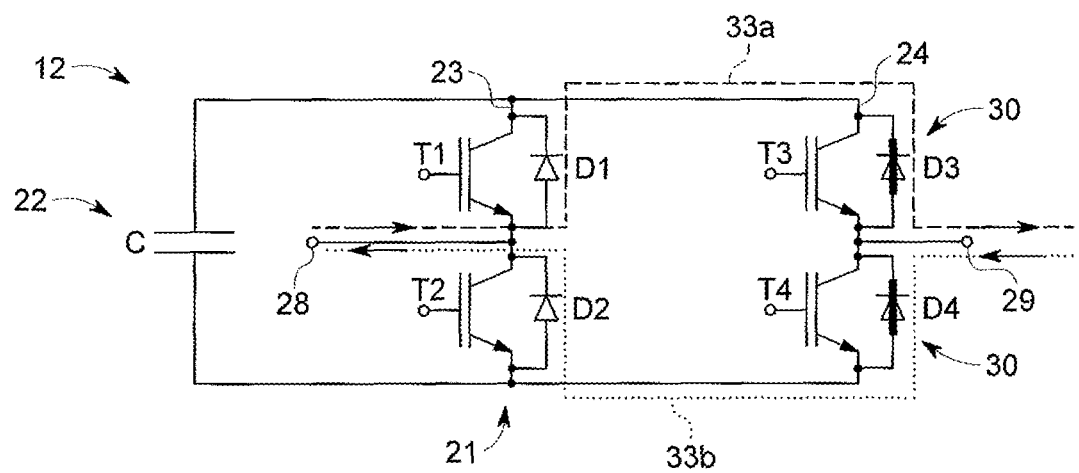

To illustrate the way in which the short circuit device 30 operates, FIGS. 3A, 3B, and 3C show simplified circuit diagrams of different embodiments of the power converter submodule 12 in FIG. 2A illustrating various resulting bypass paths. As was already mentioned, it is necessary for at least two selected free-wheeling diodes D1-D4 of the submodule 12 shown in FIG. 2A to be manufactured in press pack design and for their blocking capability to be suitably designed so that they break down under the respective fault conditions. To accomplish this, any two of the freewheeling diodes D1-D4 of the full bridge 21 can be selected that do not lie on a bridge diagonal, e.g., diodes D1 and D2, or D3 and D4, or D1 and D3, or D2 and D4. However, if this is desired or required, it is also possible for all freewheeling diodes to be manufactured in press pack design.

In FIG. 3A, e.g., the two upper freewheeling diodes D1, D3, which are connected with the first DC voltage node 26, are configured in press pack design and are designed to have a smaller blocking capability than the freewheeling diodes D2, D4 and the semiconductor switches (IGBTs) T1-T4. The free-wheeling diodes D2, D4 and the power semiconductor switches T1-T4 can be cost-effectively made with a modular design, although the press pack design is generally also possible for them.

FIG. 3A also illustrates the drive unit 31, which is provided to control the IGBT switches T1-T4 of the bridge circuit 21. However, the drive unit 31 can also form a part of a higher-level control of the power converter 4. The drive unit 31 can also have a detection device or circuit 32 (only schematically shown here), which is configured to detect a fault in one of the power semiconductor switches T1-T4 in the bridge circuit 21 or its driver that requires the initiation of the short-circuit fault mode. To accomplish this, the detection circuit 32 can, e.g., monitor the currents or voltages of the individual power semiconductors T1-T4 of the submodule 12.

For example, a typical fault for a submodule 12 shown in FIG. 3A is explained below. The switches 21 (T1 through T4) and the freewheeling diodes D2 and D4 are implemented in modular design and the freewheeling diodes D1 and D3 are implemented in press pack design, the diodes D1 and D3 being designed with reduced blocking capability, for the purpose of the generation of a bypass path in case of the corresponding fault in accordance with an embodiment of the present invention. Let the submodule located within a power converter shown in FIG. 1 be in regular operation; when the switch T2 is turned off a turn-off fault occurs that has the consequence of an internal short circuit in the switch T2. When T1 is subsequently turned on, a short circuit current forms that is detected by the detection circuit 32, which then turns T1 back off. The switches T3 and T4 are also turned off.

After that, the submodule is in pulse blocking, i.e., all firing commands of the active switches are blocked. The power converter shown in FIG. 1 then continues to operate, and the power semiconductor switches of the described faulty H-bridge circuit remain turned off. In further operation, the submodule 12 still has a current impressed from the AC voltage side through the connections 28, 29. The broken down switch T2 produces a bypass path through D4 for the positive current direction of the power converter through this bridge. If there is current reversal in the corresponding arm 11a-11c of the power converter 4, current is conducted along a path through D3 via the capacitor C and the broken down switch T2, which continuously charges the intermediate circuit capacitor C 22 of the submodule. This further increases the voltage $u_{dc}$ of the capacitor C 22, until it exceeds the maximum rated operating voltage. The free-wheeling diodes D1 and D3 are designed so that they break down at a certain overvoltage above the maximum rated operating voltage.

If the intermediate circuit voltage exceeds the limit of the blocking capability of one of the diodes D1, D3, this leads to the breakdown of the respective press pack diode. In the case that D1 breaks down, an intermediate circuit short-circuit is produced through D1 and T2, which prevents the deliberate breakdown of diode D3 for the time being. The bypass path for the positive current direction through the faulty active switch T2 lasts until its bond wire connections finally melt or open. After that, there is once again a path for the positive current direction through D1 and D4 that charges the capacitor until the intermediate circuit voltage exceeds the blocking capability of D3 and also destroys it, and creates the stable bypass path of the submodule 12 through the broken-down press pack diodes D1 and D3. For the case in which D3 was initially destroyed before D1, the negative current charges the capacitor through the broken-down components D3 and T2 until D1 is destroyed by its blocking capability being exceeded, producing the final bypass path of the module through D1 and D3 as a consequence.

For events such as the direct intermediate circuit short-circuit inside 23 or 24, which have the consequence of a fault condition of active switches without low-impedance short circuit, this means a current path through the corresponding freewheeling diode. This current path allows, for at least one current direction, charging of the capacitor C 22 for deliberate destruction of the diodes to form a bypass.

The breakdown has the consequence that an ultimately stable low-impedance short circuit forms through the free-wheeling diodes D1 and D3. As is illustrated in FIG. 3A, a long-term, stable low-impedance short circuit path 33 between the first and the second AC connection 28, 29 arises which runs through the two broken-down free-wheeling diodes D1, D3 and in which a short circuit current as large as the operating current can permanently flow. The short circuit current can flow in both directions through the short circuit path 33, part of which is formed by the broken-down freewheeling diodes D1, D3, as is shown in FIG. 3A by the dashed line with the double arrows.

Analogous to the above-described example, the inventive embodiment of the short circuit device ensures that in the various faults a bypass path ultimately forms and the bridge circuit cannot turn into an open circuit, i.e., become an open current path of the power converter arm. Even if a durable fault current due to a faulty power semiconductor switch T1-T4 or lack of control of an initial bridge short-circuit or destruction of the power semiconductor switches T1-T4 cannot be completely excluded, this can be accepted if all four freewheeling diodes D1-D4 are manufactured in press pack design. Then, a stable low-impedance short circuit path between the AC connections 28, 29 can always be guaranteed. The submodule 12 can continue to be operated in the short-circuit fault mode until the next scheduled service measure, which also allows further operation of the entire power converter 4, 8 (FIG. 1).

Instead of the upper freewheeling diodes D1, D3 in FIG. 3A, it would also be possible for the lower freewheeling diodes D2, D4, which are connected with the second DC voltage node 27, to be configured in press pack design and be designed to have a smaller blocking capability than the other components of the submodule 12, so that they break down above a certain overvoltage. When a fault occurs, the freewheeling diodes D2, D4 then form part of the bypass path 33.

FIGS. 3B and 3C show circuit diagrams similar to FIG. 3A that correspond to embodiments of the power converter submodule 12 in FIG. 2A and illustrate the bypass paths 33 that result if either the freewheeling diodes D1, D2 in the first power semiconductor branch 23 or alternatively the freewheeling diodes D3, D4 in the second power semiconductor branch 24 are made in press pack design and designed to break down when there is a fault, in accordance with an embodiment of the present invention. As is apparent, two different short circuit paths 33 result for the short circuit current, one for each different current direction.

In FIG. 3B, the short circuit current flows along a short circuit path 33a, as indicated by a dashed line with an arrow, from the first AC connection 28 through the broken-down freewheeling diode D2, on through the freewheeling diode D4 to the second AC connection 29 of the submodule 12. In FIG. 3B, a short circuit current also flows in the opposite direction along a short circuit path 33b which, as indicated by a dotted line with an arrow, goes from the second AC connection 29 through the freewheeling diode D3, on through the broken-down freewheeling diode D1, to the first AC connection 28 of the submodule 12. The freewheeling diodes D3 and D4 should be designed for a short-circuit current that might possibly be excessive for a short time and for higher blocking capability than the freewheeling diodes D1, D2. The breakdown voltage of the freewheeling diodes D1, D2 should be selected to be lower than that of the IGBT switches T1-T4 and that of the other freewheeling diodes D3, D4.

In FIG. 3C, the short circuit current flows along a short circuit path 33a, as indicated by a dashed line with an arrow, from the first AC connection 28 through the freewheeling diode D1, on through the broken-down freewheeling diode D3 to the second AC connection 29 of the submodule 12. In FIG. 3C, a short circuit current also flows in the opposite direction along a short circuit path 33b which, as indicated by a dotted line with an arrow, goes from the second AC connection 29 through the broken-down freewheeling diode D4, on through the freewheeling diode D2, to the first AC connection 28 of the submodule 12. The freewheeling diodes D1 and D2 should be designed for a short circuit current that might possibly be excessive for a short time and to have higher blocking capability than the freewheeling diodes D3, D4. The breakdown voltage of the freewheeling diodes D3, D4 should be selected to be lower than that of the IGBT switches T1-T4 and that of the other freewheeling diodes D1, D2.

Figure 4A:
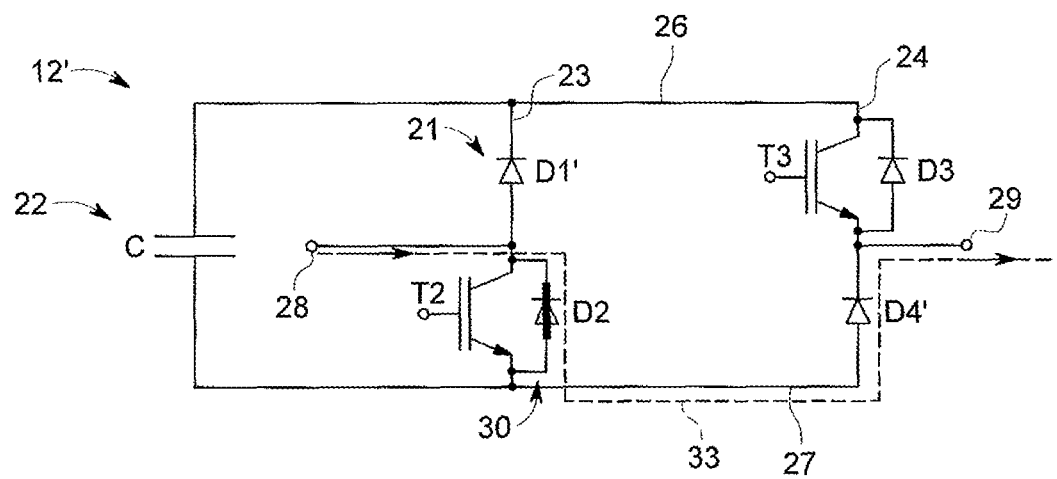
FIGS. 4A and 4B show simplified circuit diagrams of different embodiments of a power converter submodule of the asymmetrical full bridge topology shown in FIG. 2B, illustrating various resulting bypass paths.
Figure 4B:
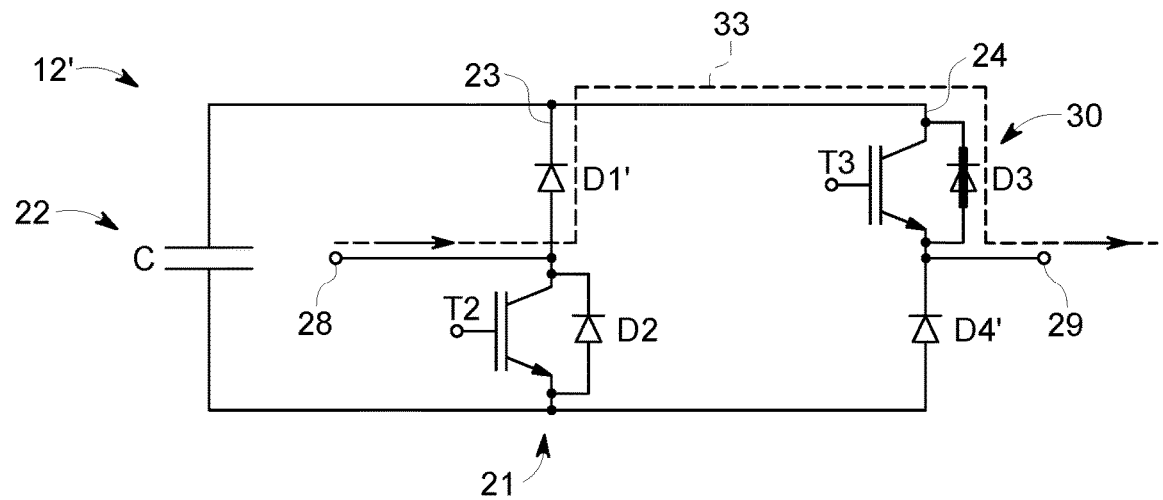

FIGS. 4A and 4B show circuit diagrams of different embodiments of the unidirectional power converter submodule 12' shown in FIG. 2B illustrating various resulting bypass paths 33. Since the asymmetric full bridge 21 of the submodule 12' requires or supports current flow only in a single direction, here only one of the freewheeling diodes D2 and D3, which are connected anti-parallel to the power semiconductor switches T2, T3, must be configured in the press pack design and designed to break down when a fault occurs, in accordance with an embodiment of the present invention. As is apparent from FIG. 4A, if the freewheeling diode D2 breaks down, a short circuit path 33 results, as indicated by a dashed line with an arrow, from the first AC connection 28 through the broken-down freewheeling diode D2, on through the freewheeling diode D4' to the second AC connection 29 of the submodule 12'. The breakdown voltage of the freewheeling diode D2 should be selected to be lower than that of the IGBT switches T1-T4 and that of the other freewheeling diodes D1', D3, D4'.

In FIG. 4B, the short circuit current flows in the same direction along a short circuit path 33, as indicated by a dashed line with an arrow, from the first AC connection 28 through the freewheeling diode D1', on through the broken-down freewheeling diode D3 to the second AC connection 29 of the submodule 12'. Here the diode D1' should be designed to be correspondingly short circuit proof and to have higher blocking capability than the freewheeling diode D3. The breakdown voltage of the freewheeling diode D3 should be selected to be lower than that of the IGBT switches T1-T4 and that of the other freewheeling diodes D1', D2, D4'. Alternatively or additionally, the freewheeling diode D2 can also be rated so that it is broken down by a current whose intensity is less than or equal to the normal operating current.

It goes without saying that in the submodule 12" shown in FIG. 2C one of the freewheeling diodes D1 and D4 is correspondingly broken down, resulting in the same short circuit paths 33 as in FIGS. 4A and 4B, however with the short circuit current flowing in the opposite direction.

In the above-mentioned embodiments shown in FIGS. 4A and 4B and analogous to FIG. 2C, all power semiconductor switches and the first and second diode are manufactured in modular design, while only a single freewheeling diode is manufactured in press pack design. This can minimize the costs. Alternatively, all of both freewheeling diodes can be manufactured in press pack design.

Figure 5:
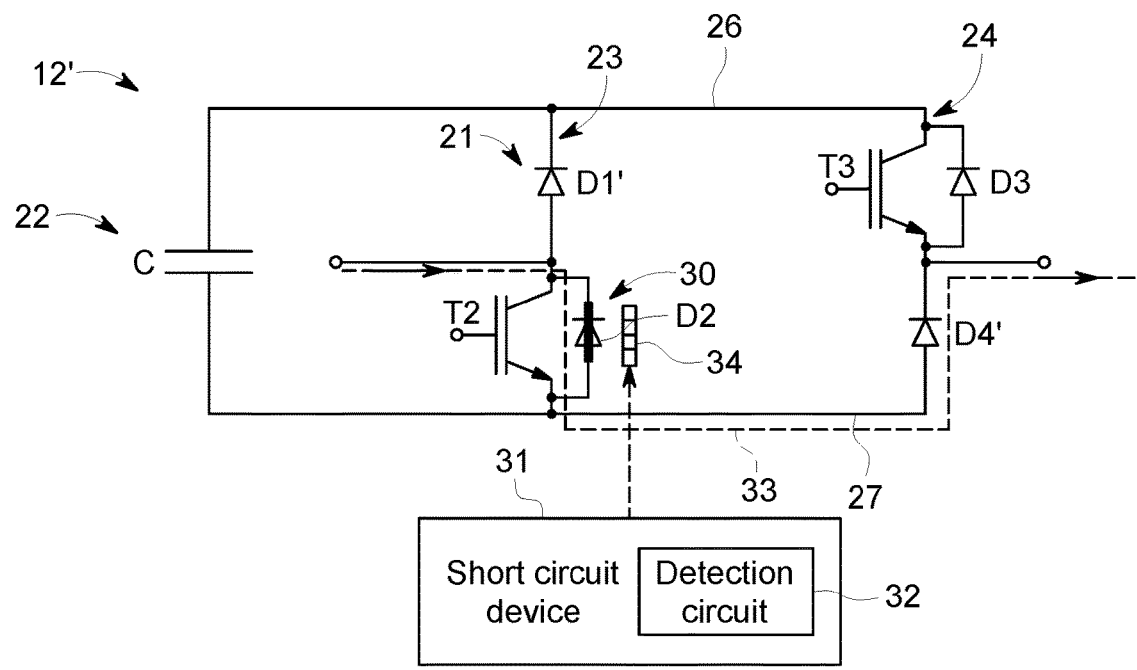
FIG. 5 shows a simplified schematic of a circuit diagram of a modified embodiment of a power converter submodule that uses a temperature influencing device, in accordance with an embodiment of the present invention.
Figure 6:
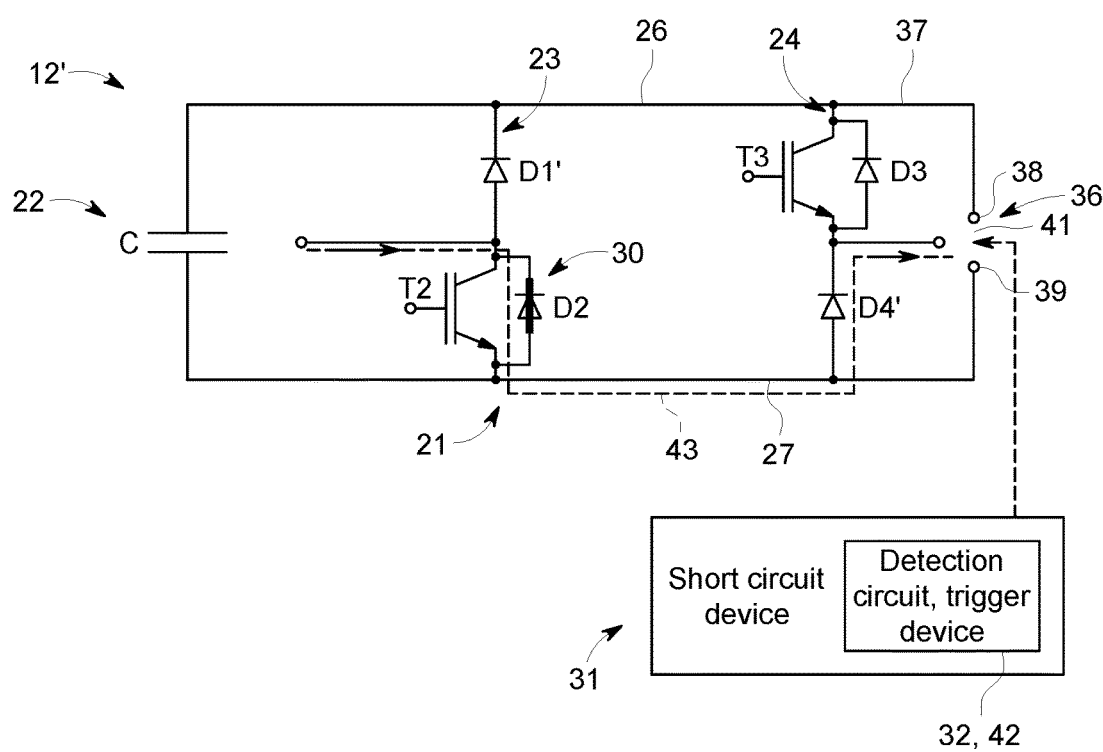
FIG. 6 shows a simplified schematic of a circuit diagram of another embodiment of a power converter submodule that uses a spark gap, in accordance with an embodiment of the present invention.

FIGS. 5 and 6 illustrate modified embodiments of the inventive submodule 12' and the short circuit device 31 for them in a greatly simplified circuit diagram representation similar to FIGS. 2B and 4A. If the form and/or function correspond, these figures use the same reference numbers as are used in the above description. It should be noted that the further developments can also equally apply to the submodule 12 or 12" shown in FIGS. 2A and 2C.

The embodiment shown in FIG. 5 differs from that shown in FIGS. 2B and 4A only in that here the breakdown of the at least one selected freewheeling diode D2 and D3 that is anti-parallel to a power semiconductor switch T2 or T3 is not, or not primarily, caused by an overvoltage across the capacitor C 22. Instead, here the short circuit device 31 additionally has a temperature influencing device 34 that is configured to cause a temperature increase on or near the at least one selected freewheeling diode D2 and D3, to bring about fusion or breakdown of the freewheeling diode by an overtemperature. In FIG. 5, the temperature influencing device 34 is only illustrated using a corresponding functional block 34, which can alternatively represent a heating device, e.g., an electric heater or a resistance heater, a fluid heater, or something similar, which can be used for direct heating of the respective freewheeling diodes D2 and D3, or a cooling device, which is, e.g., fluid-operated, whose cooling power decreases when a fault occurs, e.g., can be adjusted downward.

The temperature influencing device 34 can be under the open-loop or closed-loop control of the drive unit 31 in reaction to the detection of a fault in the submodule 12' (or 12 or 12"). This embodiment is suitable especially for less time-critical applications, in which the time until the at least one freewheeling diode breaks down can be several seconds or minutes. Here it is possible for the submodule 12, 12', or 12" to be temporarily operated so that no current flows through the submodule temporarily, or so that the power converter 4, 8 is temporarily turned off until the breakdown occurs.

FIG. 6 shows a schematic circuit diagram of another embodiment of the power converter submodule 12' that uses a triggered spark gap 36 for the short circuit device 31. An additional branch 37 is connected parallel to the capacitor C 22 and the bridge circuit 21, in which the triggered spark gap 36 is arranged with two electrodes 38, 39 that are spatially separated from one another. A discharge space 41 between the two electrodes 38, 39 contains a gas, e.g., air. If the spark gap 36 is fired by a trigger pulse, e.g., a high-voltage pulse, then the electric field that arises ionizes the gas in the discharge space 41, so that it becomes conductive. The spark gap 36 is short-circuited by a spark within fractions of a microsecond due to the impact ionization.

When there is a fault in the submodule 12' the spark gap 36 is fired by the drive unit 31 or a separate trigger device 42. This allows the capacitor C 22 to discharge quickly through the branch 37. As soon as the voltage of the capacitor C 22 reverses polarity after that, i.e. the voltage across the capacitor becomes slightly negative, the freewheeling diodes D2, D3 become conductive. Then, a corresponding current flows through the freewheeling diodes D2, D3 that is high enough to cause the breakdown of at least a selected one of them that is designed for a smaller surge current withstand strength, so that the short circuit path 33 is created. Of course the spark gap 36 can also be used in the other submodules 12 and 12" illustrated here and in other comparable power converter submodules.

In another embodiment, not shown in detail here, all elements that contribute to forming the stable short circuit path 33, 33a, 33b can be in the form of press pack semiconductor devices and can be designed to break down. This applies especially for the diodes D1', D4' in FIG. 2b or D2' and D3' in FIG. 2c, and likewise especially for the embodiment in FIG. 6 with a spark gap. The high housing strength and short circuit stability of press pack diodes are beneficial for these components.

A short circuit device for a submodule 12 for a power converter 8, 9 is provided, wherein the submodule includes a bridge circuit 21 having at least one power semiconductor branch 23, 24 extending between a first and a second DC voltage node 26, 27 and having at least one controllable power semiconductor switch T1-T4 disposed therein to which a freewheeling diode D1-D4 is connected in anti-parallel, and a capacitor C 22 connected in parallel with the bridge circuit 21. The short-circuit device 30 includes at least one selected of the freewheeling diodes D1-D4 anti-parallel to the power semiconductor switches T1-T4 of the bridge circuit 21, wherein the at least one selected freewheeling diode D1-D4 is manufactured in press pack design and rated such that, when a fault occurs in the submodule 12, the at least one selected freewheeling diode D1-D4 breaks down due to the fault conditions and provides a durable, stable, low-impedance short circuit path 33 between a first and a second AC voltage connection 28, 29 of the submodule 12.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A submodule for a power converter, comprising:
   a full bridge circuit comprising at least two power semiconductor branches connected between a first DC voltage node and a second DC voltage node, each power semiconductor branch having a controllable power semiconductor switch with a freewheeling diode connected in anti-parallel thereto;
   a capacitor connected in parallel to the full bridge circuit between the first and second DC voltage nodes; and
   a short circuit device comprising at least one selected of the freewheeling diodes anti-parallel to the controllable power semiconductor switches of the full bridge circuit, wherein the controllable power semiconductor switches are not manufactured in press pack design, and wherein the at least one selected freewheeling diode is manufactured in press pack design and rated such that, when a fault occurs in the submodule, the at least one selected freewheeling diode breaks down due to fault conditions and provides a low-impedance short-circuit path between a first AC voltage connection and a second AC voltage connection of the submodule.

2. The submodule according to claim 1, wherein the power semiconductor branches each comprise two controllable power semiconductor switches connected in series, each controllable power semiconductor switch having an anti-parallel freewheeling diode associated thereto and the connection points thereof forming the first AC voltage connection and the second AC voltage connection of the submodule, respectively.

3. The submodule according to claim 2, wherein all of the controllable power semiconductor switches are manufactured in modular design, wherein selected freewheeling diodes are manufactured in press pack design.

4. The submodule according to claim 3, wherein the selected freewheeling diodes are exactly two freewheeling diodes, which are either positioned in a single of the two power semiconductor branches or connected to a single of the first and second DC voltage nodes.

5. The submodule according to claim 3, wherein all free-wheeling diodes are manufactured in press pack design.

6. The submodule according to claim 3, wherein the low-impedance short-circuit path comprises no further electronic components apart from the one or more selected freewheeling diodes, which are broken down, and the first and/or second diode, if present.

7. The submodule according to claim 1, wherein the bridge circuit comprises:
the first power semiconductor branch having a series connection of a first controllable power semiconductor switch and a first diode; and
the second power semiconductor branch having a series connection of a second controllable power semiconductor switch and a second diode, wherein the first and second diodes are positioned in a bridge diagonal of the bridge circuit and each controllable power semiconductor switch is assigned an anti-parallel freewheeling diode, wherein a connection point between the first controllable power semiconductor switch and the first diode forms the first AC voltage connection of the submodule and a connection point between the second controllable power semiconductor switch and the second diode forms the second AC voltage connection of the submodule.

8. The submodule according to claim 7, wherein all of the controllable power semiconductor switches, and both the first and the second diodes, are manufactured in modular design, wherein a single one of the freewheeling diodes is manufactured in press pack design.

9. The submodule according to claim 7, wherein all of the controllable power semiconductor switches, and both the first and the second diodes, are manufactured in modular design, wherein all freewheeling diodes are manufactured in press pack design.

10. The submodule according to claim 7, wherein all of the controllable power semiconductor switches are manufactured in modular design, and both the first and the second diodes and all of the freewheeling diodes are manufactured in press pack design.

11. The submodule according to claim 1, wherein the fault conditions resulting in a breakdown of the at least one selected freewheeling diode include at least one of an overvoltage over the at least one selected freewheeling diode, an overtemperature at the at least one selected freewheeling diode, and a fault current through the at least one selected freewheeling diode.

12. The submodule according to claim 11, further comprising a drive unit configured to, upon detecting a fault case, switch off all controllable power semiconductor switches of the submodule or keep them switched off to cause further charging of the capacitor up to a voltage which provides the overvoltage at the at least one selected freewheeling diode.

13. The submodule according to claim 11, comprising a triggerable spark gap connected in a branch in parallel to the full bridge circuit between the first and second DC voltage nodes, wherein the spark gap, when triggered, causes a fault current through the submodule with a reversing current which effects the breakdown of the at least one selected freewheeling diode.

14. The submodule according to claim 11, comprising a temperature influencing device configured to cause an increase of temperature at or in the vicinity of the at least one selected freewheeling diode, when a fault occurs in the submodule.

15. The submodule according to claim 14, further comprising a drive unit configured to, upon detection of a fault case, switch off all controllable power semiconductor switches of the submodule or keep them switched off and to control the temperature influencing device and/or to trigger the spark gap.

16. A power converter for converting an AC voltage into a DC voltage or vice versa, comprising:
at least one phase branch, which comprises two or more series-connected submodules according to claim 1, wherein a first AC voltage connection of at least one submodule is electrically connected to a second AC voltage connection of an adjacent submodule and wherein there is a power converter AC voltage connection tapped in each phase branch.

17. The power converter according to claim 16, further comprising:
a detection circuit configured to detect a defect of at least one controllable power semiconductor switch or its driver in any one of the submodules of the power converter; and
a control device having the drive unit configured to, upon detection of such a defect, switch off all controllable power semiconductor switches of the submodule or keep them switched off and, if needed, to take further measures resulting in the breakdown of the press pack diodes to effect the low-impedance short-circuit path in the submodule.

* * * * *